P. A. HOTTMANN.
MACHINE FOR MAKING SPAGHETTI OR SIMILAR PRODUCTS.
APPLICATION FILED MAR. 26, 1915.
1,319,080.
Patented Oct. 21, 1919.
5 SHEETS—SHEET 3.
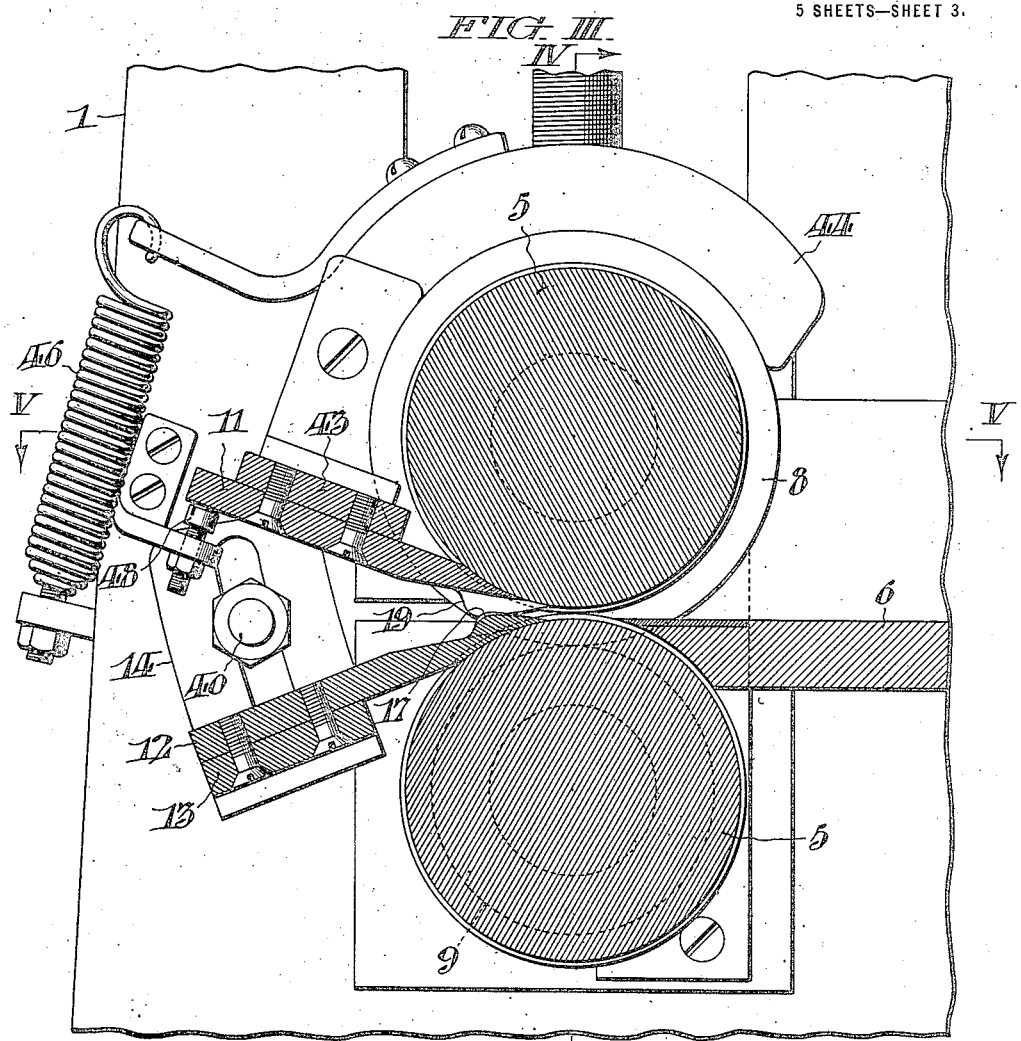
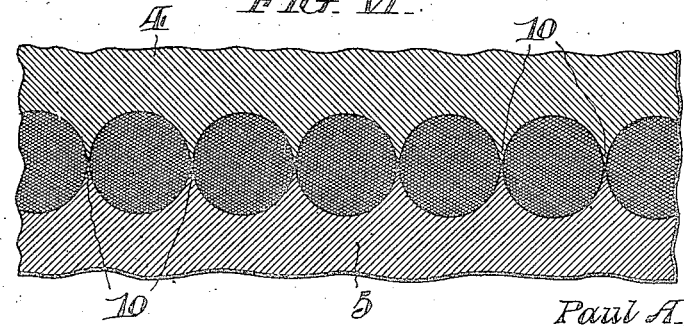

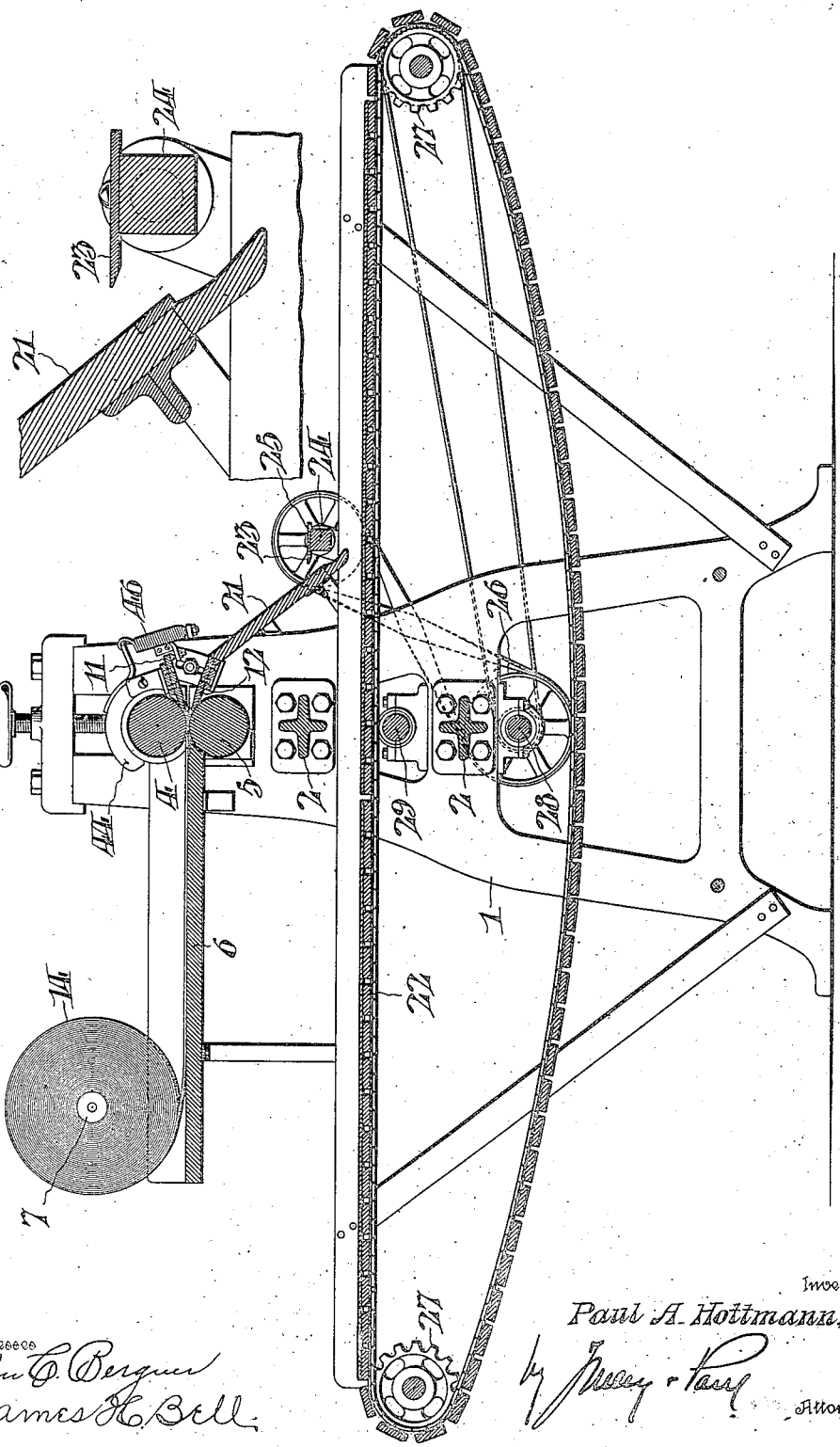

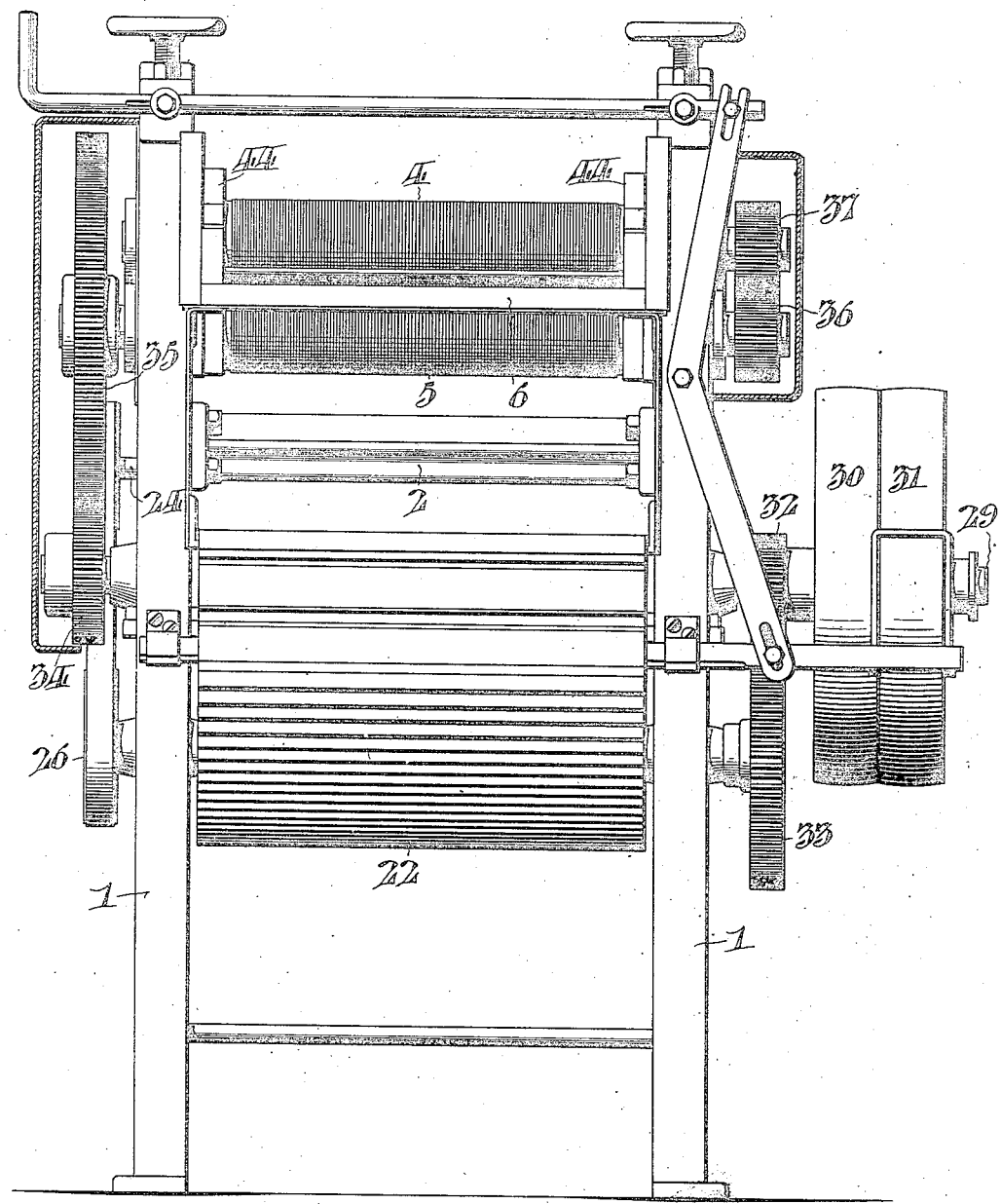

P. A. HOTTMANN.
MACHINE FOR MAKING SPAGHETTI OR SIMILAR PRODUCTS.
APPLICATION FILED MAR. 26, 1915.
1,319,080.
Patented Oct. 21, 1919.
5 SHEETS—SHEET 4.
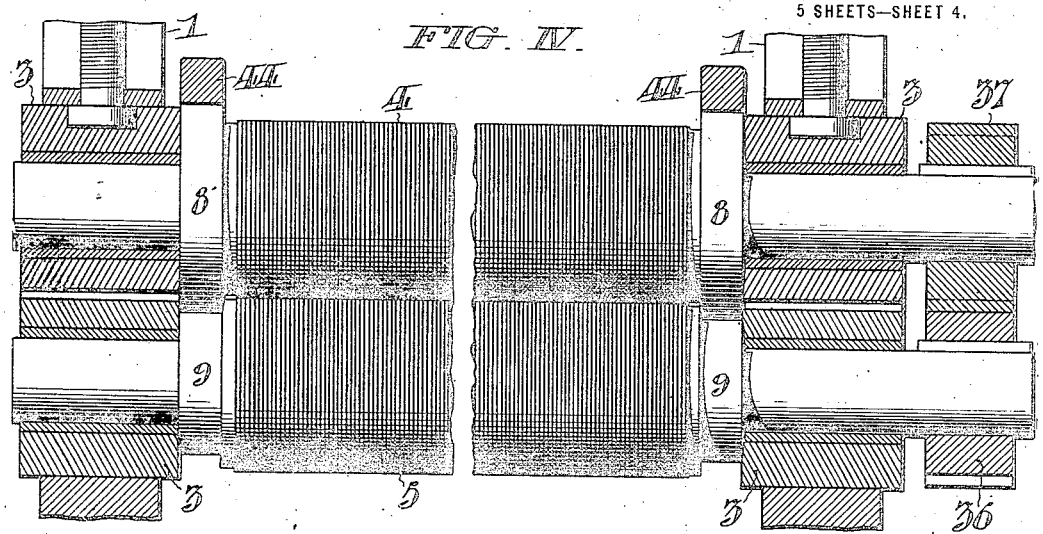
FIG. IV.
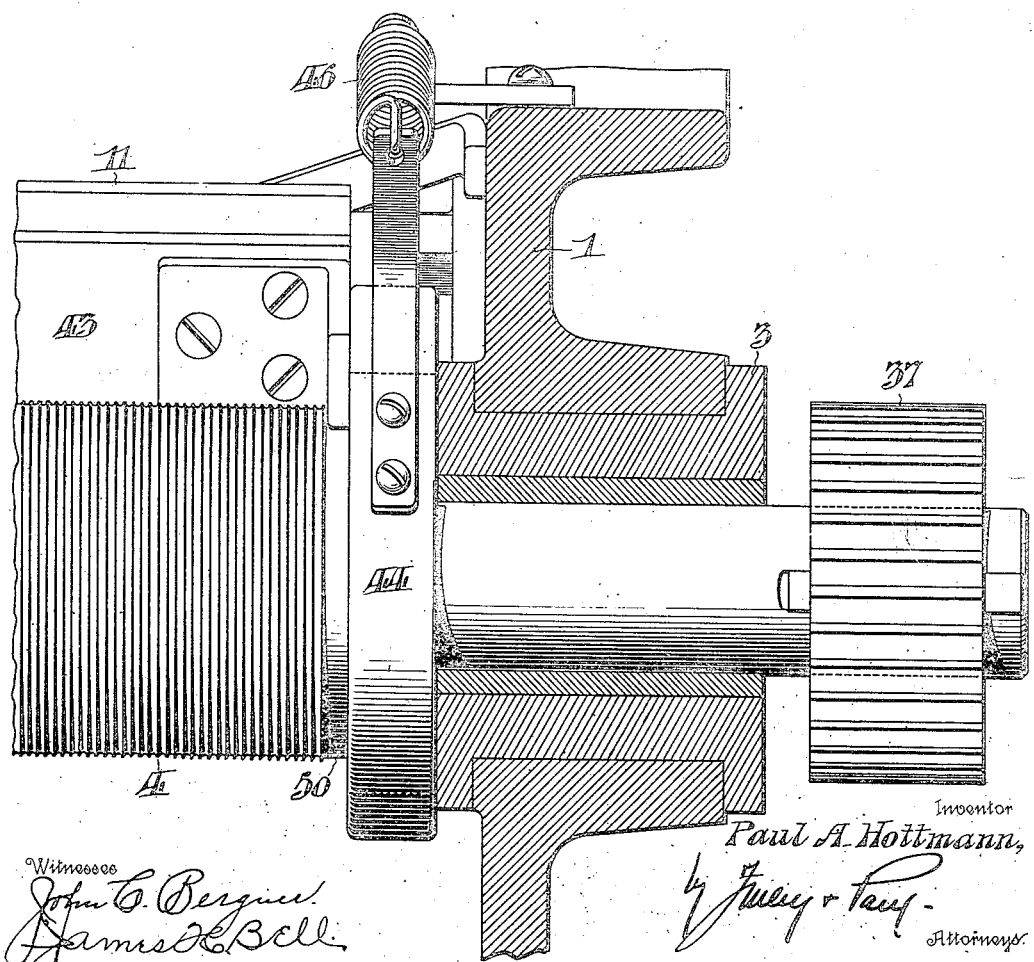
FIG. V.
Inventor
Paul A. Hottmann,
Witnesses P. A. HOTTMANN.
MACHINE FOR MAKING SPAGHETTI OR SIMILAR PRODUCTS.
APPLICATION FILED MAR. 26, 1915.
1,319,080.
Patented Oct. 21, 1919.
5 SHEETS—SHEET 5.
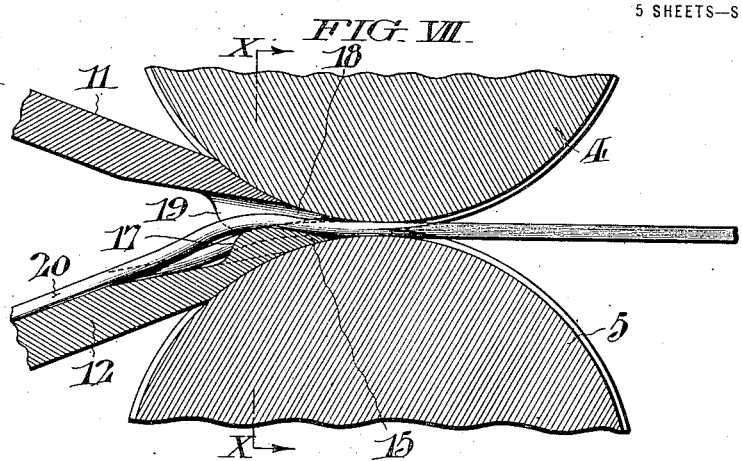
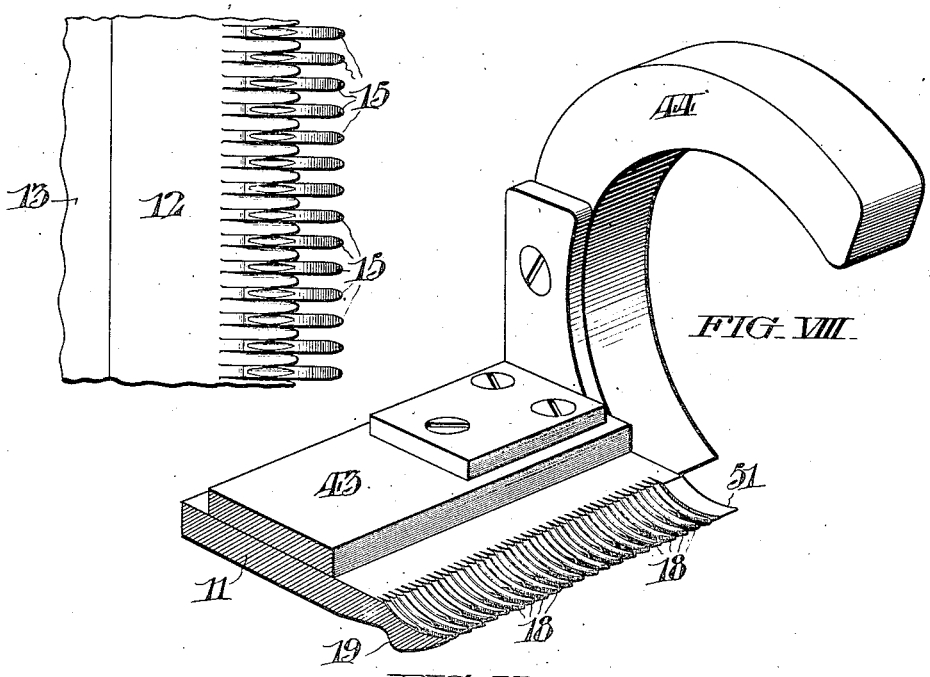
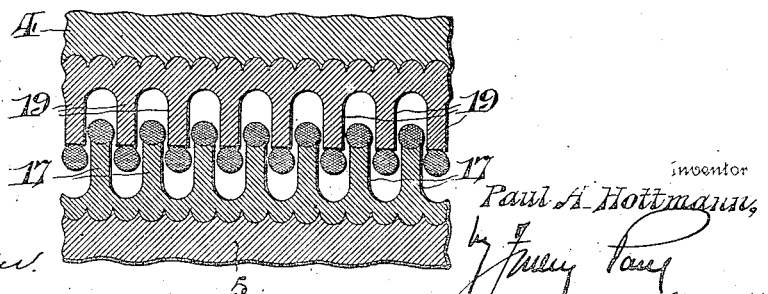

UNITED STATES PATENT OFFICE.

PAUL A. HOTTMANN, OF PHILADELPHIA, PENNSYLVANIA, ASSIGNOR TO FREIHOFER BAKING COMPANY, OF PHILADELPHIA, PENNSYLVANIA, A CORPORATION OF PENNSYLVANIA.

MACHINE FOR MAKING SPAGHETTI OR SIMILAR PRODUCTS.

1,319,080.  Specification of Letters Patent.  Patented Oct. 21, 1919.

Application filed March 26, 1915. Serial No. 17,096.

*To all whom it may concern:*

Be it known that I, PAUL A. HOTTMANN, a subject of the Emperor of Germany, who has declared his intentions of becoming a citizen of the United States, residing at Philadelphia, in the county of Philadelphia and State of Pennsylvania, have invented certain new and useful Improvements in Machines for Making Spaghetti or Similar Products, whereof the following is a specification, reference being had to the accompanying drawings.

My invention relates to a machine whereby a flat sheet of dough is subdivided into round strings, as of spaghetti, which are by the machine cut into appropriate lengths and laid upon boards for drying.

Accordingly in my invention I provide suitable mechanism, such as grooved rolls, by which a continuous flat sheet of dough fed between the rolls is formed into a series of parallel strings lying close together usually united by a thin web; also mechanism whereby these strings thus formed are completely separated, by being temporarily alternately deflected into diverging planes; means whereby all the strings thus separated are restored to the same plane and in their initial close parallel relation; mechanism whereby they are cut into appropriate lengths; and a traveling carrier by which boards are successively passed beneath the point where the cut lengths are fed, receiving them still in the same close parallel relation upon their surface, so that the boards carrying them may be taken to an appropriate place for drying.

In the accompanying drawings, Figure I, is a longitudinal sectional view of a machine embodying my invention.

Fig. II, is an end elevation of the same, as viewed from the left of Fig. I.

Fig. III, is a cross sectional view through the rolls, and separating combs on an enlarged scale.

Fig. IV, is a fragmentary sectional elevation of the machine indicated by the arrows IV, IV, in Fig. III.

Fig. V, is a fragmentary horizontal sectional view indicated by the arrows V, V, in Fig. III.

Fig. VI, is an enlarged sectional view of a portion of the abutting surfaces of the rolls.

Fig. VII, is a cross sectional view through the abutting portions of the rolls and combs, showing their operation in dividing the flat sheet of dough into strings.

Fig. VIII, is a partial perspective view of the upper comb and its yielding support.

Fig. IX, is a partial plan view of the lower comb.

Fig. X, is a sectional view along the line X, X, of Fig. VII, showing the relation of the combs to each other.

Fig. XI, is an enlarged sectional view of the cutting mechanism.

Referring to Fig. I, the standards 1, 1, are united by suitable spacing webs 2, 2. Near their tops the standards are slotted for the reception of the bearing blocks 3, 3, which carry the upper roll 4, and the lower roll 5. Mounted in front of the rolls is a table 6, upon which is carried a roller 7, capable of receiving a large roll 14, of flat dough. The edge of the table 6, is appropriately shaped to terminate just at the entrance of the two rolls, as seen in Fig. III.

The surfaces of the upper and lower rolls are grooved as seen in Figs. IV, and V, and on a larger scale in Fig. VI. The grooves are set quite close to each other, those of the upper roll being in opposition to corresponding grooves of the lower roll. The size of two complementary grooves is such as to form of the dough passing between them a string of spaghetti, usually about one-tenth of an inch in diameter, and since the grooves are set close together, the strings of spaghetti are correspondingly closely spaced, as is necessary for drying and packing.

On either side of the grooved portion the rolls are provided with separating collars 8, 8, 9, 9, those belonging to the upper roll being of larger diameter than those belonging to the lower roll, so that their meeting planes do not correspond to that of the grooved portion. The diameter of the separating collars is such that the grooved portions of the rolls are held a slight distance apart, so that the points between the grooves although in opposition, fail to meet. From this construction it results that the flat sheet of dough passing between the rolls, although deeply indented, is not by the rolls completely formed into separated strings, but rather into a number of such strings united in the median plane by slight webs 10, as shown in Fig. VI.

Between the grooved portion of the roll and the separating collars, are short flat spaces 50, for the passage of the trimmed edges of the sheet of dough.

For the breaking apart of these webs 10, and the entire separation of the strings from each other, I provide interlocking combs 11, 12, which I will now describe. The lower comb 12, projects between the rolls on their far side and is shaped as shown in Figs. III, VII, IX and X. The sharpened edge of the comb is subdivided into teeth 15, one corresponding to every other groove on the lower roll 5. The lower surface of this lower comb with its series of teeth is so shaped as to conform exactly to the grooved roll 5, where it fits closely against it, as shown in Fig. X. The other surface of this comb is shaped as by provision of the hump or projection 17, on the top of each tooth, whereby the string which each tooth displaces from its groove is slightly raised in relation to its fellows. The upper comb 11, which similarly projects between the rolls as shown in Figs. III, VII, VIII, and X, is sharpened and subdivided into teeth 18, one for every other groove in the upper roll 4, these teeth alternating with and lying partially between the teeth of the lower comb 12. The upper surface of the upper comb conforms to the surface of the roll 4, and its lower surface is shaped to provide a hump 19, on the back of each tooth, whereby the string which each tooth displaces from its groove is slightly lowered in relation to its fellows. At the edges of the combs are scrapers 51, which keep the edge strips of dough from adhering to the flat spaces 50.

As a result of the action of the alternating teeth of these combs, the sheet of dough after being rolled into strings united by a slight web, is, when it reaches the line X, X, Fig. VII, subdivided completely into strings 20, alternating in two planes as shown in Fig. X. Owing to the limited extension of the humps 17, and 19, the strings of spaghetti after being thus alternately deflected into diverging planes are restored to their parallel position close together in a common plane, and almost in contact with each other, in which parallel relation they pass down the inclined table 21, which leads to near the surface of an endless carrier 22. Near the lower edge of this inclined table 21, a transverse knife 23, is mounted on a rotating shaft 24. This shaft carries a pulley 25, driven by a belt from the pulley 26, whereby it is rotated at such speed that the edge of the knife cuts the parallel strings into suitable lengths.

The endless carrier 21, consists of slats carried by links passing around sprocket wheels 27, 27, one of which sprockets is driven by a pulley on the shaft 28, carrying the pulley 26. As seen in Fig. II, this shaft 28, is in turn driven from the main shaft 29, whence the machine derives its motion from fast and loose pulleys 30, and 31, mounted upon it, and controlled by a belt shifter as shown in Fig. II, which needs no detailed description.

The main shaft 29, also carries a pinion 32, meshing with the large gear wheel 33, on the shaft 28, the opposite end of which carries a gear 34, meshing with the gear 35, on the axis of the upper roll 5. The upper roll 4, is driven from the lower roll by means of the intermeshing pinions 36, and 37.

The gears and pulleys which have been described are so proportioned that the sheet of dough is drawn continually from the roll 14, between the rolls and combs and subdivided into strings, as of spaghetti, which after being cut in lengths are received upon a succession of boards which are fed continuously to the endless carrier, and which after receiving a quantity of the product may be removed and set aside to dry. The original parallelism and close spacing of the strings having been maintained, the product occupies a minimum space in drying.

It is important that the combs should be capable of a nice adjustment in their relation to each other, and to the rolls, and also that at least one of them be capable of yielding in case too large a mass of dough should find its way between the rolls. For this purpose the lower comb 12, is mounted on a transverse bar 13, provided at either end with slotted wings 14, adjustably secured to the standards 1, by bolts 40. The upper comb 11, is mounted on a transverse bar 43, carried at either end by half segments 44, one of which is shown on an enlarged scale in Fig. VIII. These segments 44, partially encircle the collars 8, 8, of the upper roll, and are capable of limited rotation upon it. The comb 11, is held in its normal position as shown in Fig. III, by the tension of springs 46, attached to the segments and fast at their lower ends to the standards. An adjustable stop 48, as shown in Fig. III, is provided to limit the motion of the upper comb as it swings around the roll, so that it may not be forced too far between the rolls.

The action of the machine which I have thus described will be understood by those acquainted with the peculiar physical characteristics and tenacity of a sheet of dough, such as is used for the making of spaghetti. The sheet is so tough and rubbery that it cannot be accurately cut into separated strings simply by the action of the grooved rolls themselves, and the spacing of the rolls is such that the edges of the rolls do not touch each other, and therefore do not wear against or interfere with each other. The grooves terminate short of the ends of the rolls as best shown in Fig. IV, thereby permitting the release of the excess dough trimmed off the edges. The alternating teeth of the combs separate the strings into different planes, thus severing the webs, the torn edges of which practically disappear. In this way complete separation of the strings, as well as their proper formation, is secured. Strings of spaghetti are produced by my machine with much less waste than by machines in which the dough is forced through a die.

The close spacing of the grooves of the rolls produces a corresponding close spacing of the strings of spaghetti, which is maintained even to the packing of the finished article with corresponding economy of space.

Having thus described my invention, I claim:

1. In a machine of the class described, the combination of means for feeding a continuous sheet of dough; means including paired rolls with closely spaced grooves between which said dough is passed, whereby it is separated into traveling strings in closely spaced parallel relationship, and means for feeding said traveling strings in a single plane and in the same close parallel relationship upon drying boards.

2. In a machine of the class described, the combination of means for feeding a continuous sheet of dough; means including paired rolls with closely spaced grooves between which said dough is passed whereby it is separated into closely spaced parallel strings, and means for cutting said strings into lengths and feeding them upon drying boards with maintenance of their initial closely spaced parallel relationship.

3. In a machine of the class described, a pair of grooved rolls whereby a sheet of dough is formed into parallel strings united by unsevered intervening webs in combination with means whereby said webs are completely severed.

4. In a machine of the class described, a pair of grooved rolls slightly spaced apart so as to form a sheet of dough into parallel strings united by unsevered intervening webs, in combination with means for leading alternate strings into diverging planes and thereby completely severing the webs.

5. In a machine of the class described, the combination of grooved rolls spaced so that a sheet of dough passing between them is formed into parallel strings united by intervening webs; means whereby the strings are alternately led into temporarily diverging planes, whereby the webs are severed; and means whereby after such severance all of the strings are returned to their initial parallel relationship in a single plane.

6. In a machine of the class described, the combination of paired grooved rolls, a stripping comb, swinging under spring tension around its corresponding roll, and a stop to limit its approach to the bite of the rolls.

7. In a machine for subdividing dough into strings, a pair of rolls provided with a series of opposed grooves and slightly spaced apart, so that the projections between the grooves in the two rolls are held out of contact and lateral expansion of the dough passing between the rolls is permitted.

8. In a machine of the class described, the combination of a pair of rolls having a series of opposed grooves; separating collars carried by said rolls and adapted to contact with each other, said collars having a combined diameter slightly greater than the combined diameter of the rolls, whereby the projections between the grooves in one roll will be held from contact with the opposed projections between the grooves in the other roll.

9. In a machine of the class described, the combination of a pair of rolls having a series of opposed grooves; separating collars carried by said rolls and adapted to contact with each other, said collars having a combined diameter of slightly greater than the combined diameter of the rolls, whereby the projections between the grooves in one roll will be held from contact with the opposed projections between the grooves in the other roll, said collars being of unequal diameter, whereby the plane separating the collars is different from that separating the grooved portions of the rolls.

In testimony whereof, I have hereunto signed my name, at Philadelphia, Pennsylvania, this twenty-fourth day of March, 1915.

PAUL A. HOTTMANN.

Witnesses:
JOHN H. APEL,
JAMES H. BELL.